United States Patent
Mattson et al.

(10) Patent No.: US 9,235,659 B2
(45) Date of Patent: Jan. 12, 2016

(54) LOCAL BEHAVIOR IN A VARIATIONAL SYSTEM

(71) Applicant: Siemens Product Lifecycle Management Software Inc., Plano, TX (US)

(72) Inventors: Howard Charles Duncan Mattson, Cambridge (GB); Douglas Joseph King, Peterborough (GB); Yanong Zhu, Cambridge (GB); Feng Yu, Irvine, CA (US)

(73) Assignee: Siemens Product Lifecycle Management Software Inc., Plano, TX (US)

(*) Notice: Subject to any disclaimer, the term of this patent is extended or adjusted under 35 U.S.C. 154(b) by 121 days.

(21) Appl. No.: 14/216,053

(22) Filed: Mar. 17, 2014

(65) Prior Publication Data

US 2015/0261889 A1  Sep. 17, 2015

(51) Int. Cl.
*G06G 7/48* (2006.01)
*G06F 17/50* (2006.01)

(52) U.S. Cl.
CPC ............ *G06F 17/50* (2013.01); *G06F 17/5009* (2013.01)

(58) Field of Classification Search
CPC .............................. G06F 17/50; G06F 17/5009
USPC ............ 345/681, 619, 419; 700/97, 100, 103, 700/104
See application file for complete search history.

(56) References Cited

U.S. PATENT DOCUMENTS

| | | | | |
|---|---|---|---|---|
| 7,623,139 | B1* | 11/2009 | Gifford | G06F 17/5086 345/619 |
| 2007/0091119 | A1 | 4/2007 | Jezyk et al. | |
| 2007/0174027 | A1 | 7/2007 | Moiseyev | |
| 2008/0252663 | A1* | 10/2008 | Kripac | G06F 17/5086 345/681 |
| 2010/0013833 | A1 | 1/2010 | Gandikota et al. | |
| 2010/0274535 | A1 | 10/2010 | McDaniel | |
| 2012/0069011 | A1* | 3/2012 | Hurt | G06T 19/00 345/419 |
| 2014/0012546 | A1 | 1/2014 | Mattson | |
| 2014/0324394 | A1* | 10/2014 | Mattson | G06F 17/50 703/1 |

OTHER PUBLICATIONS

Thompson et al., "Aspects of numerical grid generation: current science and art", American Institute of Aeronautics and Astronautics , 1993.*
Jami J. Shah, "Designing and Parametric CAD: Classification and comparison of construction techniques", Arizona University, 2001.*
Girard et al., "The EBP system: bringing programming to end users", 3rs ERCIM workshop on user interfaces, France, Nov. 1997.*
Foreign Communication From a Related Counterpart Application, PCT Application No. PCT/US2015/018430, International Search Report and Written Opinion dated May 27, 2015, 9 pages.

* cited by examiner

*Primary Examiner* — Kandasamy Thangavelu

(57) ABSTRACT

Methods for CAD editing and corresponding systems and computer-readable mediums. A method includes receiving a CAD model including a plurality of entities and receiving a user input including a selection of at least one entity and a movement of the selected entity. The method includes applying any basic condition behaviors that correspond to the user input and applying any optional condition behaviors that correspond to the user input. The method includes building a variational system to be solved based on the user input, any applied basic condition behaviors, and any optional condition behaviors. The method includes performing a variational solve on the variational system to produce an edited CAD model and storing the edited CAD model.

20 Claims, 11 Drawing Sheets

LOCAL BEHAVIOR IN A VARIATIONAL SYSTEM

TECHNICAL FIELD

The present disclosure is directed, in general, to computer-aided design, visualization, and manufacturing systems ("CAD systems"), product lifecycle management ("PLM") systems, and similar systems, that manage data for products and other items (collectively, "Product Data Management" systems or PDM systems).

BACKGROUND OF THE DISCLOSURE

CAD systems enable creation, visualization, and modification of object models. Improved systems are desirable.

SUMMARY OF THE DISCLOSURE

Various disclosed embodiments include methods for CAD editing and corresponding systems and computer-readable mediums. A method includes receiving a CAD model including a plurality of entities and receiving a user input including a selection of at least one entity and a movement of the selected entity. The method includes applying any basic condition behaviors that correspond to the user input and applying any optional condition behaviors that correspond to the user input. The method includes building a variational system to be solved based on the user input, any applied basic condition behaviors, and any optional condition behaviors. The method includes performing a variational solve on the variational system to produce an edited CAD model and storing the edited CAD model.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Disclosed embodiments enable intuitive editing of 2D and 3D geometry. To ensure consistent results in line with the users' expectations, the local behavior of the geometry being moved must be controlled. Disclosed embodiments include systems and methods for defining and producing desirable behaviors when editing CAD models.

Within a variational modeling system, such as the "Synchronous Technology" processes used in Siemens Product Lifecycle Management Software, Inc. products, changes are generally expressed variationally. A variational system describes the parameters of and relationships between features in an object model or set of curves in terms of geometric constraints and dimensions. Such systems then use a "solver" process to process these constraints and dimensions, along with a multitude of ancillary constraints and dimensions required to maintain design intent, and the required portion of the model is solved simultaneously.

Conventionally, curve geometry in either two dimensions (2D) or three dimensions (3D) has been controlled with either no constraints or by having to fully constrain the whole system, either automatically or manually. Neither of these methods has the advantages of synchronous technology, which automates a selection-based, local, fast, and intuitive edit and does not require constraining the whole system.

A CAD model is defined by a collection of geometries connected together by a series of topological and geometric relationships. These relationships need to be maintained as geometry is manipulated and so will influence the local behavior of both moving and stationary geometry.

As geometry is manipulated there are very often multiple ways in which related geometry can move with it to maintain the relationship. When viewed by a human some of these multiple solutions are clearly not desirable, but there are also many which are. This presents a challenge to any piece of software wishing to manipulate geometry in a way that is both intuitive to the user and also gives them flexibility to get their desired result.

Disclosed embodiments define desired local behavior for both the moving entities and adjacent entities and describe processes for generating this behavior in a CAD system.

Figure 1:
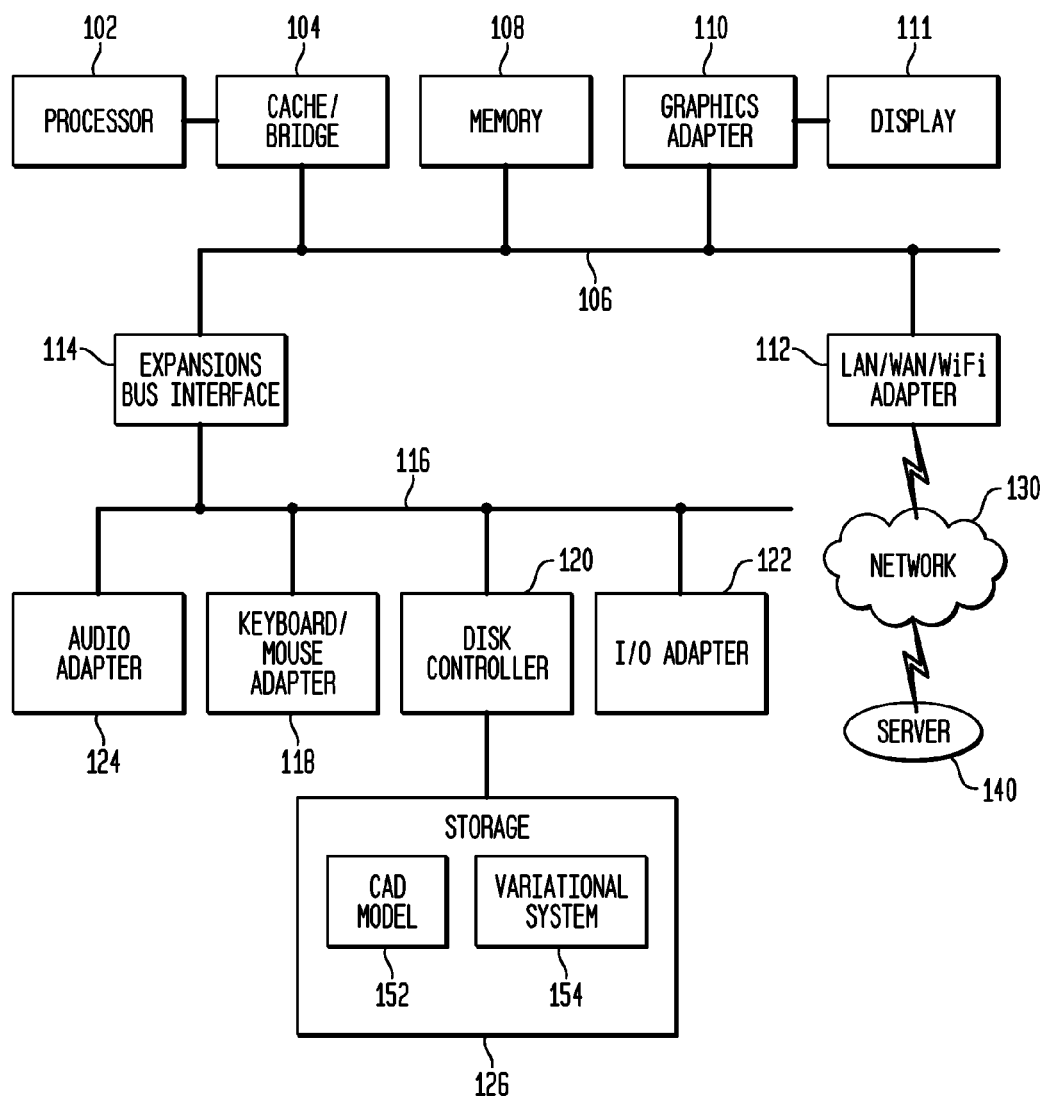
FIG. 1 depicts a block diagram of a data processing system in which an embodiment can be implemented.
Figure 2A:
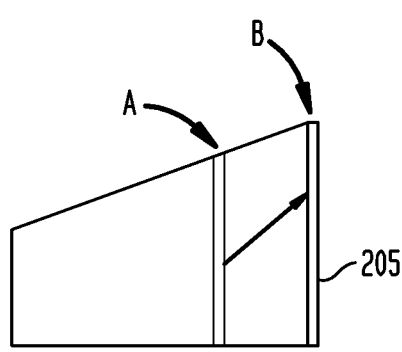
FIGS. 2A-2D illustrate examples of possible results of moving an edge in a CAD model, in accordance with disclosed embodiments.
Figure 2B:
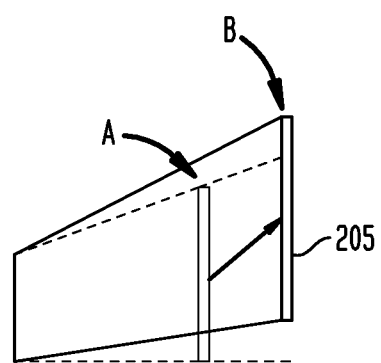
Figure 2C:
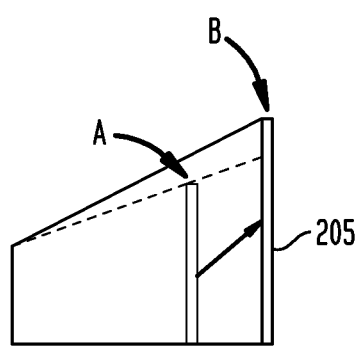
Figure 2D:
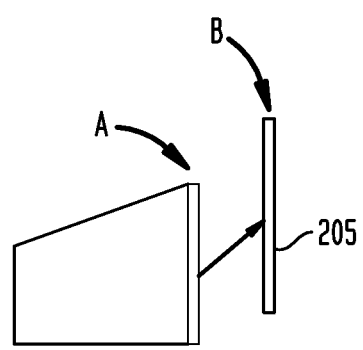

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/ Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices. Storage 126 can store such programming and data elements as the CAD model 152, variational system 154, and others discussed herein.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

FIGS. 2A-2D illustrate examples of possible results of moving an edge 205 from position A to position B in a CAD model. Considering the moving edge 205 and its connected neighbors, any of these potential results could be desired by the user. Disclosed embodiments address methods for ensuring correct and consistent results.

Various disclosed embodiments define behaviors and perform edits of CAD models in accordance with one or more of the types of connections between the geometries in the system, the user's selection, options supplied to allow the user to configure behavior to meet their requirements, or various preferences automatically applied in a computed order to the system.

While the discussion and figures herein describe and illustrate examples of two-dimensional (2D) CAD models for simplicity of illustration, the techniques and processes described herein apply equally to three-dimensional (3D) CAD models.

To produce consistent behavior in CAD models, the system can define the desirable behaviors for a variety of situations and options. The example below can be generally classified as either basic behavior, which describes the default behavior built into the system, or optional behavior, which can include a set of optional behaviors that a user can enable or disable based on the desired outcome.

The following descriptions and diagrams describe examples of methods for producing desired behavior under variational edits to a model, encompassing many different geometric and topological conditions.

FIGS. 3A-3L illustrate examples of basic behaviors for a CAD model based on specific conditions and user selections.

Figure 3A:
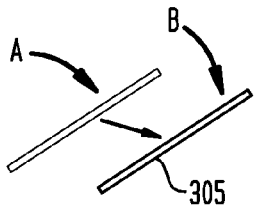
FIGS. 3A-3L illustrate examples of basic behaviors for a CAD model based on specific conditions and user selections, in accordance with disclosed embodiments.
Figure 3B:
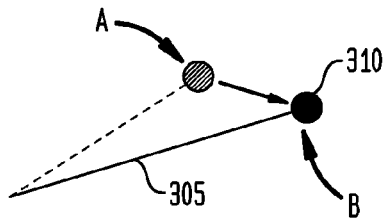
Figure 3C:
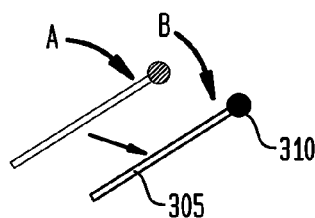

FIGS. 3A-3C illustrate a single edge vertex condition when an edge 305 or vertex 310 is moved from a first position A to a second position B. In FIG. 3A, the edge 305 is selected by the user and moved. The corresponding basic behavior is that the end vertices of edge 305 move with edge 305.

In FIG. 3B, the vertex 310 is selected by the user and moved. The corresponding basic behavior is that the edge 305 tips or rotates about the furthest vertex (opposite vertex 310). Edge 305 can also shorten or elongate to correspond to the new position of vertex 310.

In FIG. 3C, the vertex 310 and the edge 305 are both selected by the user and moved. The corresponding basic behavior is that the edge 305 and the vertices of edge 305 move together.

Figure 3D:
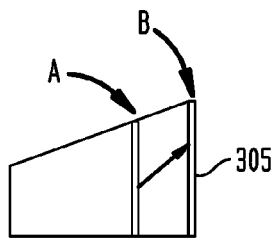
Figure 3E:
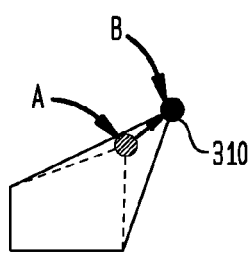
Figure 3F:
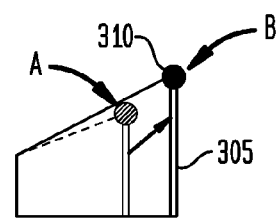

FIGS. 3D-3F illustrate a two-edge vertex condition when an edge 305 or vertex 310 is moved from a first position A to a second position B. In FIG. 3D, the edge 305 is selected by the user and moved. The corresponding basic behavior is that the vertices of edge 305 remain connected with the neighboring edges, and edge 305 is trimmed or extended according to the neighboring edges.

In FIG. 3E, the vertex 310 is selected by the user and moved. The corresponding basic behavior is that the edges attached to vertex 310 all tip or rotate about their furthest vertices (opposite vertex 310). These edges can also shorten or elongate to correspond to the new position of vertex 310.

In FIG. 3F, the vertex 310 and the edge 305 are both selected by the user and moved. The corresponding basic behavior is that the (sloping) non selected edge at the vertex 310 will tip (rotate and elongate) while the non-selected edge at the other end (horizontal) will trim or extend according to the new position of vertex 310.

Figure 3G:
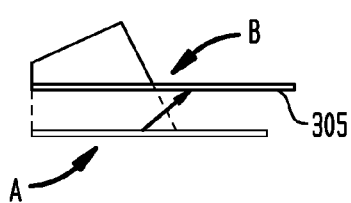
Figure 3H:
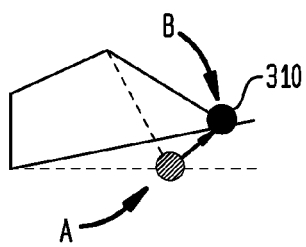
Figure 3I:
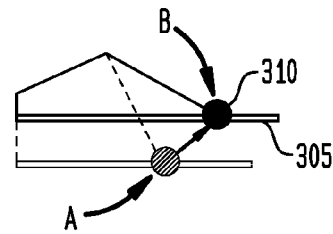

FIGS. 3G-3I illustrate a touching-vertex condition when an edge 305 or vertex 310 is moved from a first position A to a second position B. In FIG. 3G, the edge 305 is selected by the user and moved. The corresponding basic behavior is that non-selected edges that have vertices touching edge 305 are trimmed or extended according to the movement of edge 305.

In FIG. 3H, the vertex 310 is selected by the user and moved. The corresponding basic behavior is that the edges attached to or touching vertex 310 all tip or rotate about their furthest vertices (opposite vertex 310) in order to maintain their connection to vertex 310. These edges can also shorten or elongate to correspond to the new position of vertex 310.

In FIG. 3I, the vertex 310 and the edge 305 are both selected by the user and moved. The corresponding basic behavior is that the sloping non-selected edge connected to the selected vertex tips and the vertical non-selected edge connected to the selected edge trims/extends according to the new position of vertex 310 and edge 305.

Figure 3J:
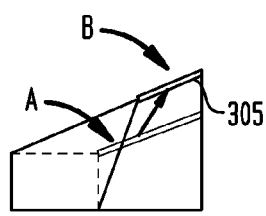
Figure 3K:
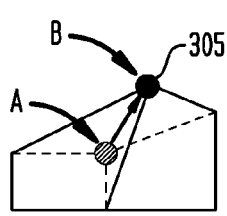
Figure 3L:
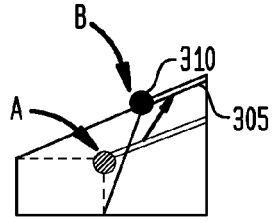

FIGS. 3J-3L illustrate a three-or-more-edge-vertex condition when an edge 305 or vertex 310 is moved from a first position A to a second position B. In FIG. 3J, the edge 305 is selected by the user and moved. The corresponding basic behavior is that the non-selected edges incident at the three edge vertex tip, and the non selected edge (incident at the two-edge vertex) trim or extend with respect to the movement of edge 305.

In FIG. 3K, the vertex 310 is selected by the user and moved. The corresponding basic behavior is that the three-or-more edges attached to vertex 310 all tip or rotate about their furthest vertices (opposite vertex 310) in order to maintain their connection to vertex 310. These edges can also shorten or elongate to correspond to the new position of vertex 310.

In FIG. 3L, the vertex 310 and the edge 305 are both selected by the user and moved. The corresponding basic behavior is that edges at the left (three-edge vertex) end tip, and edges at the right (normal) vertex end trim or extend according to the new position of vertex 310 and edge 305.

FIGS. 4A-4L illustrate examples of basic behaviors for a CAD model based on specific conditions and user selections for some other curve types. Similar basic behaviors can be defined in cases where other curve types are involved. For simplicity, the following examples show 2-edge vertex situations, but similar behavior in single, touching and three or more edge cases is included within the scope of this disclosure.

Figure 4A:
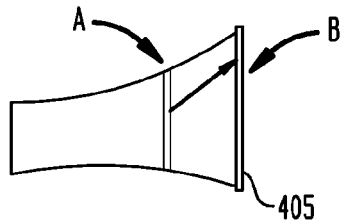
FIGS. 4A-4L illustrate examples of basic behaviors for a CAD model based on specific conditions and user selections for some other curve types, in accordance with disclosed embodiments.
Figure 4B:
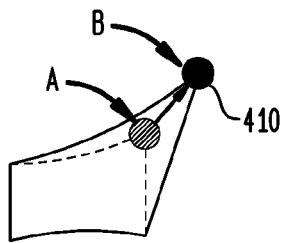
Figure 4C:
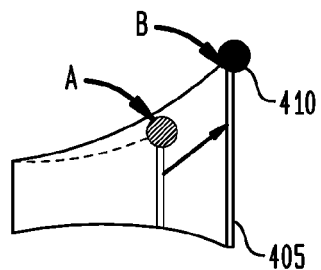

FIGS. 4A-4C illustrate a connected-arc condition when an edge 405 or vertex 410 is moved from a first position A to a second position B. In FIG. 4A, the edge 405 has at least one vertex attached to an arc and is selected by the user and moved. The corresponding basic behavior is that the edge 405 shortens or elongates to correspond to maintain connections with the connected arc(s).

In FIG. 4B, the vertex 410 is selected by the user and moved. The corresponding basic behavior is that any connected arcs or edges tip about the furthest vertex (opposite vertex 410). The connected edges or arcs can also shorten or elongate to correspond to the new position of vertex 410.

In FIG. 4C, the vertex 410 and the edge 405 are both selected by the user and moved. The corresponding basic behavior is that the edge 405 and the vertices of edge 405 (including vertex 410) move together, and any connected arcs or edges tip about the furthest vertex (opposite vertex 410). In this case, the top arc tips as it is connected to the selected vertex. The lower arc trims or extends. The connected edges or arcs can also shorten or elongate to correspond to the new position of the vertices of edge 405.

Figure 4D:
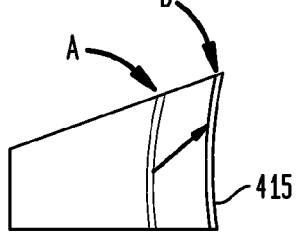
Figure 4E:
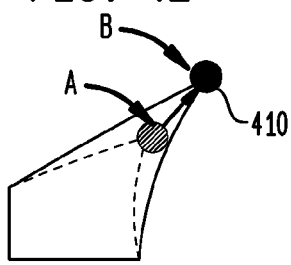
Figure 4F:
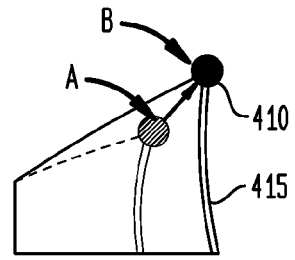

FIGS. 4D-4F illustrate a connected-arc condition when a curve 415, which is an arc in these cases, or vertex 410 is moved from a first position A to a second position B. In FIG. 4D, the curve 415 is selected by the user and moved. The corresponding basic behavior is that the arc radius of curve 415 is kept rigid, and curve 415 shortens or elongates to maintain connections with any connected edges.

In FIG. 4E, the vertex 410 is selected by the user and moved. The corresponding basic behavior is that any connected arcs or edges tip about the furthest vertex (opposite vertex 410). The connected edges or arcs can also shorten or elongate to correspond to the new position of vertex 410.

In FIG. 4F, the vertex 410 and the curve 415 are both selected by the user and moved. The corresponding basic behavior is that the edge 415 and the selected vertex 410 move together, the arc radius of curve 415 is kept rigid, and curve 415 shortens or elongates to maintain connections with any connected edges, and any connected arcs or edges tip about the furthest vertex (opposite vertex 410). That is, the top sloping non-selected edge tips, the lower horizontal edge trims or extends, and the selected edge moves with the vertex and trims at the lower end to meet the horizontal edge. The connected edges or arcs can also shorten or elongate to correspond to the new position of the vertices of curve 415.

Figure 4G:
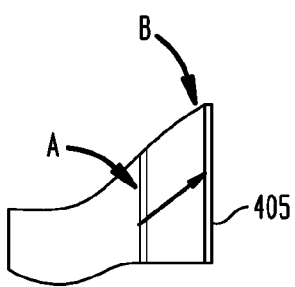
Figure 4H:
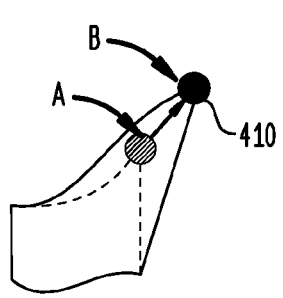
Figure 4I:
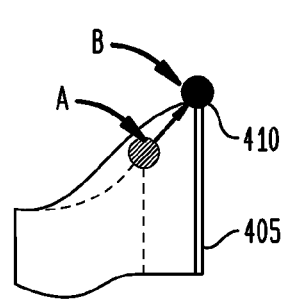

FIGS. 4G-4I illustrate a general-curve condition when an edge 405, or vertex 410 is moved from a first position A to a second position B. In FIG. 4G, the edge 405 is selected by the user and moved. The corresponding basic behavior is that the edge 405 shortens or elongates to maintain connections with any connected edges or curves.

In FIG. 4H, the vertex 410 is selected by the user and moved. The corresponding basic behavior is that any connected edges or curves tip about the furthest vertex (opposite vertex 410). The connected edges or curves can also shorten or elongate to correspond to the new position of vertex 410.

In FIG. 4I, the vertex 410 and the edge 405 are both selected by the user and moved. The corresponding basic behavior is that the edge 405 and the selected vertex move together, and any connected curves or edges tip about the furthest vertex (opposite any connected vertex). The connected edges or curves can also shorten or elongate to correspond to the new position of the vertices of edge 405. That is, in this case, the top edge tips and the bottom edge trims.

Figure 4J:
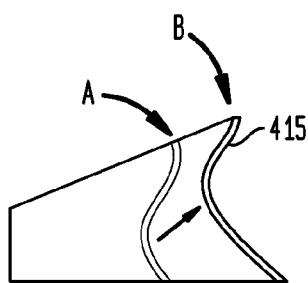
Figure 4K:
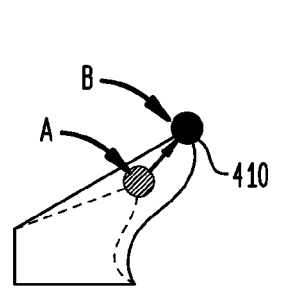
Figure 4L:
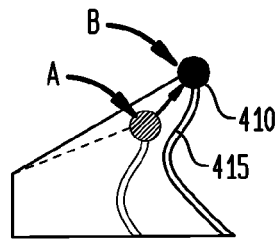

FIGS. 4J-4L illustrate a general curve condition when an curve 415 or vertex 410 is moved from a first position A to a second position B. In FIG. 4J, the curve 415 is selected by the user and moved. The corresponding basic behavior is that the shape of curve 415 is rigid but curve 415 can shorten or elongate to correspond maintain connections with any connected edges or curves.

In FIG. 4K, the vertex 410 is selected by the user and moved. The corresponding basic behavior is that the curves or edges attached to vertex 410 all tip or rotate about their furthest vertices (opposite vertex 410) in order to maintain their connection to vertex 410. These edges can also shorten or elongate to correspond to the new position of vertex 410.

In FIG. 4L, the vertex 410 and the curve 415 are both selected by the user and moved. The corresponding basic behavior is that the shape of curve 415 is rigid but curve 415 can shorten or elongate to maintain connections with any connected edges or curves. In this case, the top edge, connected to the selected vertex, also tips.

Tangency adds another layer of complexity to behavior. FIGS. 5A-5I illustrate examples of basic behaviors for a CAD model based on specific conditions and user selections for some other curve types where there is tangency between elements. The following diagrams show various selections and vertex conditions, all based around arcs and lines. Similar situations also exist for tangencies between other curve types.

Figure 5A:
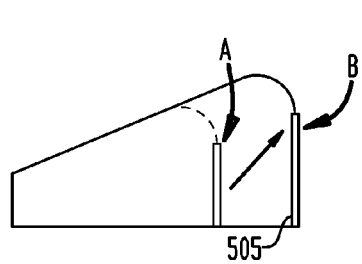
FIGS. 5A-5I illustrate examples of basic behaviors for a CAD model based on specific conditions and user selections for some other curve types where there is tangency between elements, in accordance with disclosed embodiments.
Figure 5B:
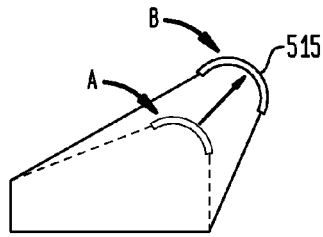
Figure 5C:
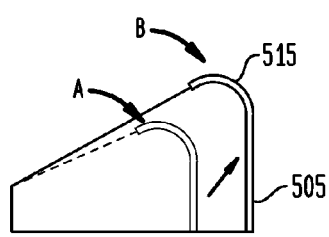

FIGS. 5A-5C illustrate a two-edge vertex tangency condition when an edge 505 or curve 515 is moved from a first position A to a second position B. In FIG. 5A, the edge 505 is selected by the user and moved. The corresponding basic behavior is that any connected curve or arc with a tangency relationship to edge 505 is moved to maintain the tangency relationship, and other edges or curves are trimmed accordingly.

In FIG. 5B, the curve 515 is selected by the user and moved. The corresponding basic behavior is that any connected arcs or edges tip about the furthest vertex (opposite the curve 515) to maintain the tangency relationship. The connected edges or arcs can also shorten or elongate to correspond to the new position of curve 515.

In FIG. 5C, the curve 515 and the edge 505 are both selected by the user and moved. The corresponding basic behavior is that the edge 505 and curve 515 move together, and any connected arcs or edges tip about the furthest vertex (opposite the curve 515) to maintain the tangency relationship. The connected edges or arcs can also shorten or elongate to correspond to the new position of the vertices of curve 515 and edge 505. The edges connected via tangency will tip and the edges connected at non-tangent points will trim or extend. So, in this case the upper edge tips, and the lower edge extends.

Figure 5D:
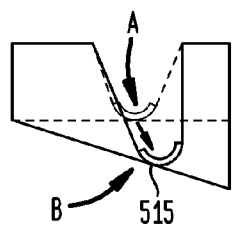
Figure 5E:
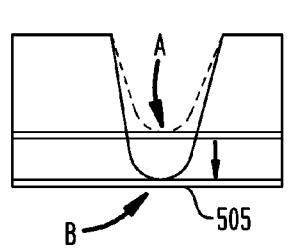
Figure 5F:
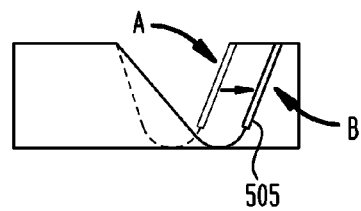

FIGS. 5D-5F illustrate a general tangency condition when a curve 515 or edge 505 is moved from a first position A to a second position B. In FIG. 4D, the curve 415 is selected by the user and moved. The corresponding basic behavior is that any connected curve or arc with a tangency relationship to curve 515 is moved to maintain the tangency relationship, and other edges or curves are trimmed or tilted accordingly.

In FIG. 5E, the edge 505 is selected by the user and moved. Edge 505 has a tangency relationship with at least one curve. The corresponding basic behavior is that any connected curves or edges tip about the furthest vertex (opposite edge 505) to maintain the tangency relationship. The connected edges or curves can also shorten or elongate to correspond to the new position of edge 505. This case differs from others in that the tipping is a level removed. The arc gets moved to keep it tangent to the selection, then its neighboring edges tip as they are tangent to the arc.

In FIG. 5F, the edge 505 is selected by the user and moved. Edge 505 has a tangency relationship with at least one curve. The corresponding basic behavior is that any non-selected edges connected tangentially to the arc tip about the furthest vertex (opposite edge 505) to maintain the tangency relationship. The connected edges or curves can also shorten or elongate to correspond to the new position of edge 505.

Figure 5G:
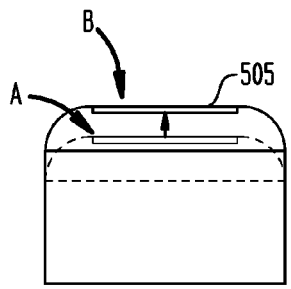
Figure 5H:
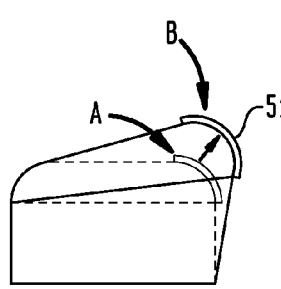
Figure 5I:
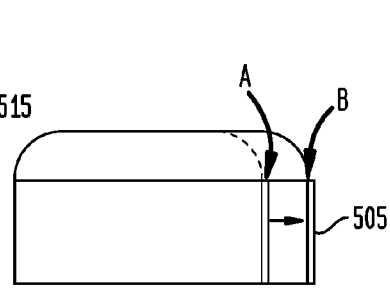

FIGS. 5G-5I illustrate a three-edge-vertex tangency condition when an edge 505 or curve 515 is moved from a first position A to a second position B. In FIG. 5G, the edge 505 is selected by the user and moved. The corresponding basic behavior is that the arcs are moved to maintain tangency and then the arcs' neighbors are elongated or shortened accordingly to maintain connections and any tangency relationships with edge 505.

In FIG. 5H, the curve 515 is selected by the user and moved. The corresponding basic behavior is that any connected edges or curves tip to maintain any tangency relationship. The connected edges or curves can also shorten or elongate to correspond to the new position of curve 515.

In FIG. 5I, the edge 505 is selected by the user and moved. The corresponding basic behavior is that the other curves or edges shorten or elongate to maintain connections and any tangency relationships with edge 505. In this case, the tangency is maintained at the top, and the edges trim or extend at the bottom.

Through many of the above examples, edges or curves are shown to "tip" or rotate to localize the changes to the model. The tipping behavior depends on the geometry type and any tangencies.

Figure 6A:
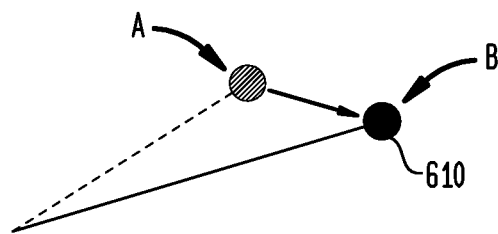
FIGS. 6A-6F illustrate examples of basic tipping behaviors in accordance with disclosed embodiments as an element is moved.
Figure 6B:
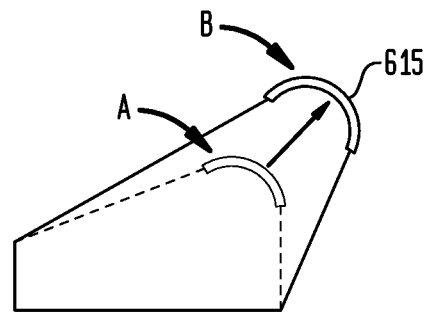

FIGS. 6A-6F illustrate examples of tipping basic behaviors in accordance with disclosed embodiments as an element is moved from a first location A to a second location B. FIG. 6A illustrates a line-tipping example when vertex 610 is moved. In this case, the connected line rotates about its furthest vertex (from vertex 610) and extends to maintain connection to vertices. FIG. 6B illustrates a line-tipping example when arc 615 is moved. In this case, the connected lines rotate and extend to maintain tangencies.

Figure 6C:
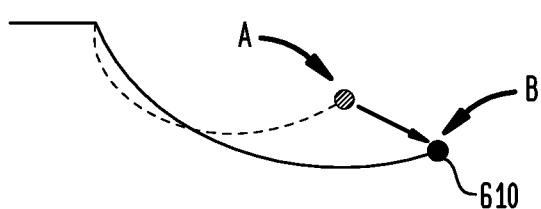
Figure 6D:
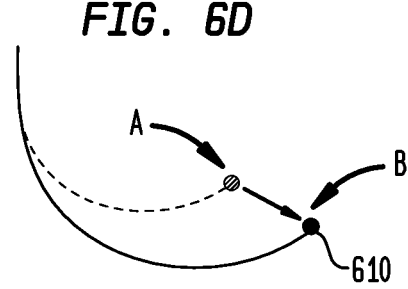

FIG. 6C illustrates an arc-tipping example when vertex 610 is moved. In this case, the connected arc "stretches" and rotates to maintain chord-height but still passes through end points to maintain its connections. FIG. 6D illustrates another arc-tipping example when vertex 610 is moved. In this case, the connected arc's radius and position move to maintain tangency and still pass through end points to maintain the arc's connections.

Figure 6E:
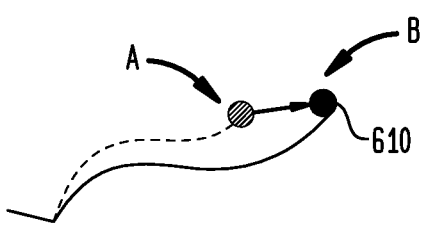
Figure 6F:
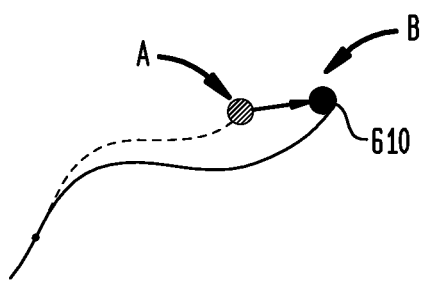

FIG. 6E illustrates a general tipping example when vertex 610 is moved. In this case, the connected curve "stretches" and rotates to maintain chord-height but still passes through end points to maintain its connections. FIG. 6F illustrates another general tipping example when vertex 610 is moved. In this case, the connected curves stretch and move to maintain tangency and still pass through end points.

Curve-height locking, as discussed herein, is the ability to "stretch" a curve to fit between two points while keeping its height constant. It applies simply to arcs by defining an arc between three points, but can also be applied to other curves. Controlling the curve height under variational change gives simple consistent behavior.

FIGS. 7A-7D illustrate basic behavior using curve-height locking in accordance with disclosed embodiments. In each of these cases, a curve or arc 715 passes from a first point PT1 to a second point PT2 through a third mid-point PT3. The curve-height is the orthogonal distance from PT3 to a (hypothetical) line connecting PT1 and PT2.

Figure 7A:
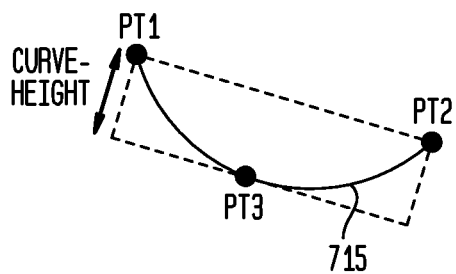
FIGS. 7A-7D illustrate basic behavior using curve-height locking in accordance with disclosed embodiments.
Figure 7B:
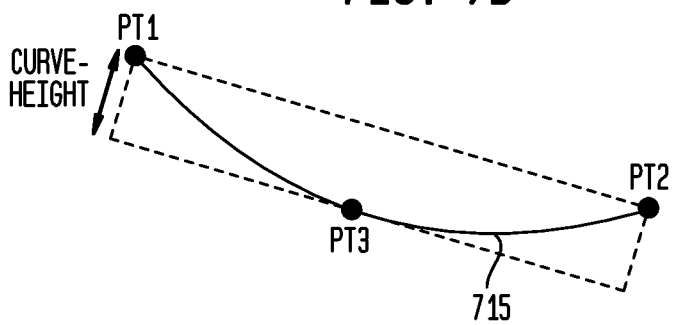

FIG. 7A shows an original curve where FIG. 7B shows a corresponding edited curve with curve-height locking. In FIG. 7A, an arc 715 is defined between PT1, PT2, and PT3. In FIG. 7B, after editing, arc 715 is stretched to fit new point positions but the chord-height is constant.

Figure 7C:
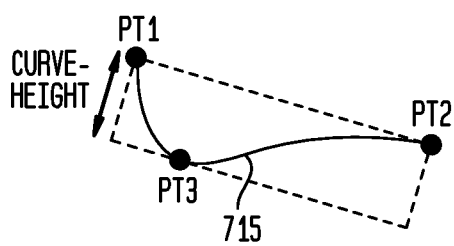
Figure 7D:
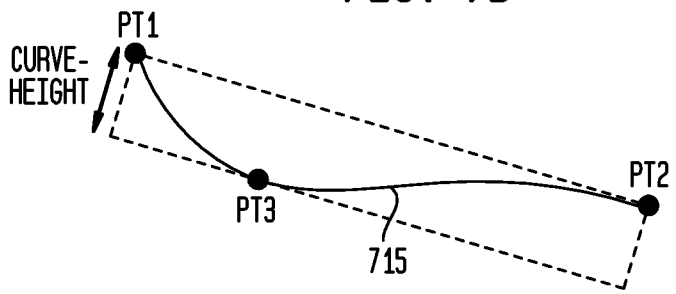

FIG. 7C shows an original curve where FIG. 7D shows a corresponding edited curve with curve-height locking. In FIG. 7A, curve 715 is defined between PT1 and PT2, touching the box at PT3. In FIG. 7D, after editing, curve 715 is stretched, but still passes from PT1 to PT2 the same curve-height at PT3.

FIGS. 8A-8L illustrate examples of optional condition behaviors for a CAD model based on specific conditions and user selections for some other curve types. The following diagrams show various selections and vertex conditions, all based around arcs and lines. Similar situations also exist for other curve types.

Figure 8A:
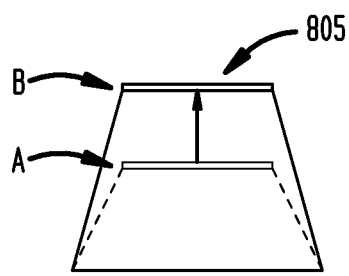
FIGS. 8A-8L illustrate examples of optional condition behaviors for a CAD model based on specific conditions and user selections, in accordance with disclosed embodiments.
Figure 8B:
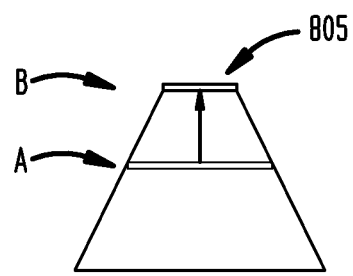

FIGS. 8A and 8B illustrate an optional constant size condition when an edge 805 is moved from a first position A to a second position B. In FIG. 8A, the optional condition is "on" and in FIG. 8B, the optional condition is "off." In FIG. 8A, the selected edge 805 stays the same, and neighbor edges rotate to adapt. In FIG. 8B, the elected edge 805 varies in size, while neighbor edges remain stationary and simply trim or extend so as to meet the moved curve.

Figure 8C:
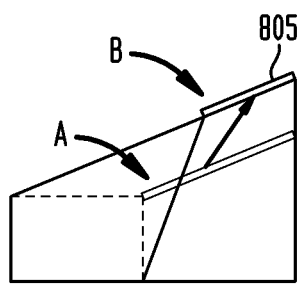
Figure 8D:
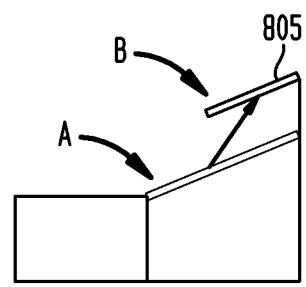

FIGS. 8C and 8D illustrate an optional preserve non-manifold condition when an edge 805 is moved from a first position A to a second position B. In FIG. 8C, the optional condition is "on" and in FIG. 8D, the optional condition is "off." In FIG. 8C, any non-manifold conditions are found and kept. In FIG. 8D, non-manifold conditions are split.

Figure 8E:
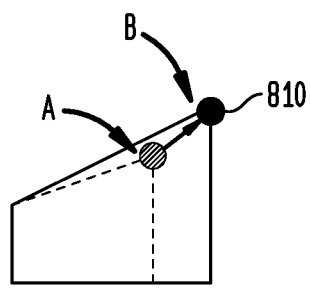
Figure 8F:
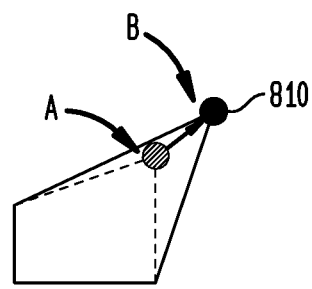

FIGS. 8E and 8F illustrate an optional horizontal/vertical locking condition when a vertex 810 is moved from a first position A to a second position B. In FIG. 8E, the optional condition is "on" and in FIG. 8D, the optional condition is "off." In FIG. 8E, the connected vertical edge stays vertical. In FIG. 8F, the connected vertical edge rotates. Of course, while this shows vertical locking, horizontal locking can be treated the same way.

Figure 8G:
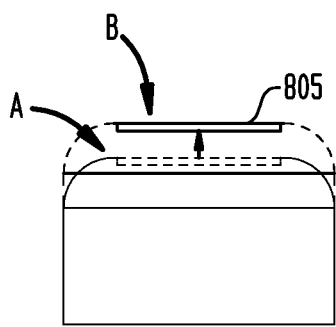
Figure 8H:
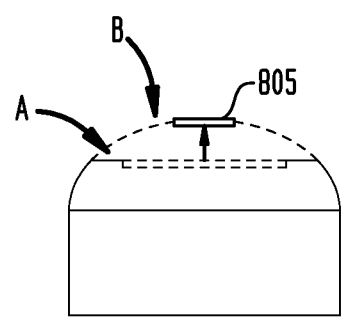

FIGS. 8G and 8H illustrate an optional size-locking condition when an edge 805 is moved from a first position A to a second position B. In FIG. 8G, the optional condition is "on" and in FIG. 8H, the optional condition is "off." In FIG. 8G, the circle radius is preserved. In FIG. 8H, the circle radius increases.

Figure 8I:
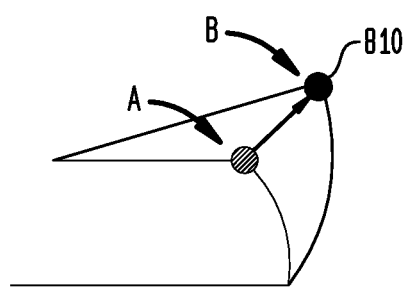
Figure 8J:
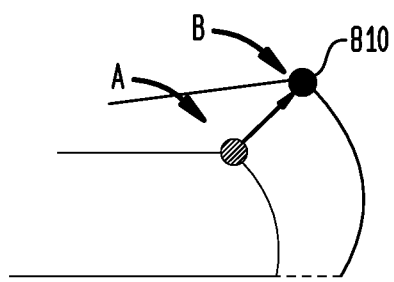

FIGS. 8I and 8J illustrate an optional tipping condition when a vertex 810 is moved from a first position A to a second position B. In FIG. 8I, the optional condition is "on" and in FIG. 8J, the optional condition is "off." In FIG. 8I, the connected line and arc tip to localize the edit. In FIG. 8H, the connected line moves to be coincident with vertex 810, while the arc changes radius and moves.

Figure 8K:
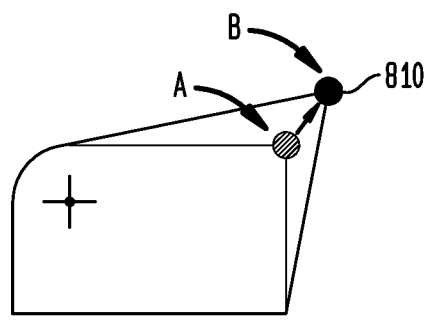
Figure 8L:
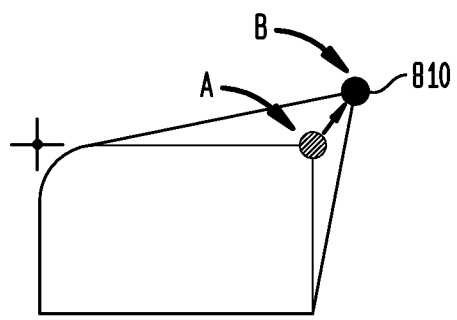

FIGS. 8K and 8L illustrate an optional "tip about" condition when a vertex 810 is moved from a first position A to a second position B, that requires the element to tip about an arc axis or virtual intersection. In FIG. 8K, the optional condition is "on" and in FIG. 8L, the optional condition is "off." In FIG. 8K, the arc in the model remains stationary and tangent to the connected line. In FIG. 8L, the virtual intersection between the two arc-connected lines remains stationary and the arc moves to stay tangent to these lines.

As noted above, all of the behaviors noted herein are described and shown with simple 2D sketches for simplicity, but these principals apply to 3D elements and models, which fall within the scope of this disclosure.

A number of the areas detailed make use of a classification of the types of connections to neighboring entities to help decide on desired behavior. For example, a connection between two edges can be described as an L-vertex.

Figure 9A:
FIGS. 9A-9F illustrate various connection classifications in accordance with disclosed embodiments.
Figure 9B:
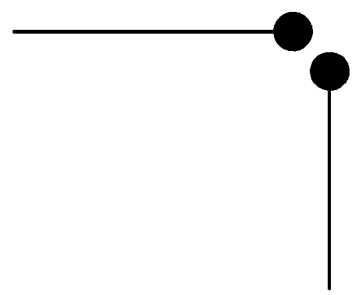
Figure 9C:
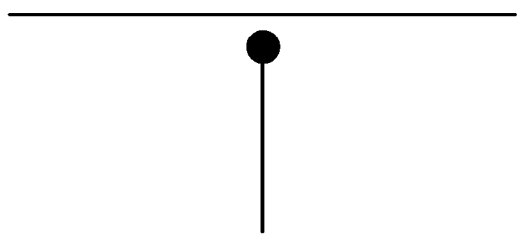
Figure 9D:
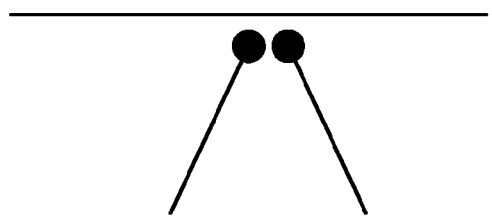
Figure 9E:
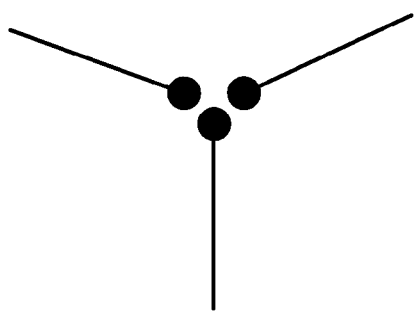
Figure 9F:
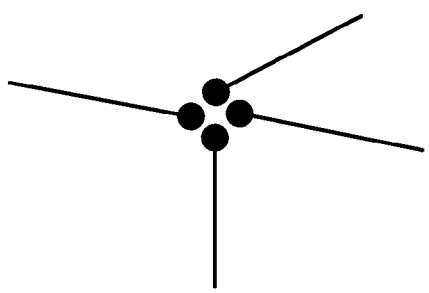

FIGS. 9A-9F illustrate various connection classifications that may be referred to herein. Again, these are described and shown in 2D for simplicity, but apply equally in 3D. The diagrams are shown with gaps between the end-points of the edge. Typically, however, these will be connected with a vertex, or be coincident. FIG. 9A illustrates an "O-vertex" that is the "open" vertex of an edge. FIG. 9B illustrates an "L-vertex" between two edges. FIG. 9C illustrates a "T-vertex" between two edges. FIG. 9D illustrates a "T-vertex" between three edges. FIG. 9E illustrates a "Y-vertex" between three edges. FIG. 9F illustrates a generalized "Y-vertex" between four edges.

One process for generating and controlling the behavior of models under edit includes several steps performed by one or more CAD data processing systems. The system will build a system to be solved that includes one or more of the desired user action (i.e. move, rotate, etc.), discovered geometric relationships (i.e. tangent, concentric, etc.), topological relationships (i.e. edge, vertex, etc.), user defined relationships (i.e. distance, radius, etc.), and preferences that define the behavior of entities (i.e. prefer-coincident, prefer-parallel, etc.).

The system can then order the preferences defined to give the desired behavior, solve the system to determine what needs to change, and apply the changes into the model.

"Preferences" are constraints which are only applied if they would not cause the system to become unsolvable. They are useful in providing general behavior characteristics that are secondary to regular constraints or conditions on the model.

For example, consider a system containing two lines where one is being rotated and the other is fixed. A parallel preference between the two lines would not be applied because it would cause the system to become unsolvable.

Disclosed embodiments extend a general variational process to include extended use of rigidity of selected entities, discovery and classification of connections, generation of additional preferences to control behavior, and additional ordering logic to control behavior.

Disclosed embodiment can make extended use of the rigidity of selected entities. All selected entities can be kept rigid during edits, which means that all entities within the selected set receive the same transform. Disclosed embodiments can extend this rigidity feature to automatically constrain any adjacent Y-vertices to be rigid with the selection. This is similar to the example of FIG. 3J. When a "constant size" option is on, the system can automatically constrain any adjacent vertices to be rigid with the selection. This is similar to the examples of FIGS. 8A and 8B.

Disclosed embodiments can make extended use of discovery and classification of connections. The system can analyze the model to automatically discover many different geometric conditions including constraints such as tangent and parallel. Disclosed embodiments can additionally discover such conditions coincident vertices, forming an L-vertex or Y-vertex as described above, and vertex-on-edge conditions, forming a T-vertex as described above.

Disclosed embodiments can make extended use of generation of additional preferences to control behavior. Preferences can be generated to define behavior of entities within the model. These individual preferences can then be ordered to give consistent behavior. Preferences can include those to provide the locked horizontal/vertical behavior described above, the locked radius behavior described above, and some rotating edge behavior when tangencies are involved. Disclosed embodiments can generate additional preferences such as chord-height-locking as described herein, rigid-if-possible on O-vertices, to ensure that O-vertices receive the same transform as their using edge such as the example in FIG. 3A, above, and do-not-move-if-possible preferences on vertices to force edges to rotate about their furthest vertex, as in several examples described above.

Disclosed embodiments can make extended use of additional ordering logic to control behavior. In general, all generated preferences are ordered by the system. This system uses a combination of logic based on the type of preference and its distance away from the user-defined operation to define an order of preferences. The preferences listed above will naturally be applied into this ordering system. Disclosed embodiments also give priority to such preferences as chord-height-locking and rigid-if-possible preferences on O-vertices are given the appropriate priority.

Figure 10:
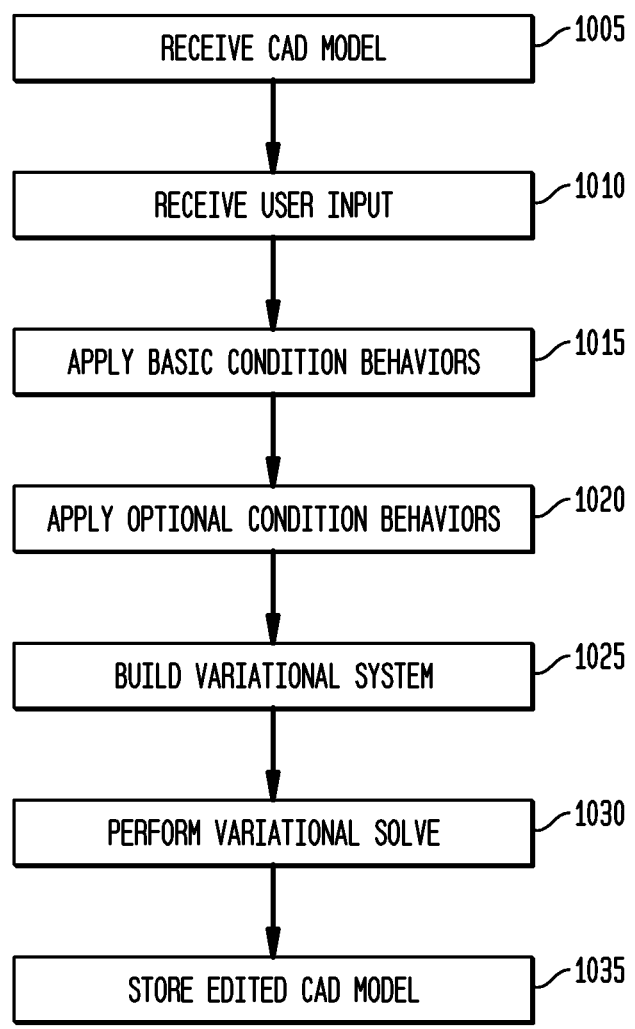
FIG. 10 depicts a flowchart of a process in accordance with disclosed embodiments.

FIG. 10 depicts a flowchart of a process in accordance with disclosed embodiments that may be performed, for example, by a CAD data processing system such as data processing system 100 described above, referred to generically as the "system" below.

The system receives a CAD model including a plurality of entities (1005). The CAD model can be a 2D or 3D model, and the entities can be 2D elements such as edges, curves, and vertices, or can be 3D elements such as edges, faces, etc. Receiving, as used herein, can include loading from storage, receiving from another device or process, receiving via an interaction with a user, or otherwise. The CAD model can be maintained in a memory or other storage such as CAD model 152.

The system receives a user input including a selection of at least one entity and a movement of the selected entity (1010).

The system applies any basic condition behaviors that correspond to the user input (1015). These can include any of the basic condition behaviors described above. As part of this process, the system can apply rigidity to selected entities as described above, and can discover or classify geometric conditions as described above.

The system applies any optional condition behaviors that correspond to the user input (1020). These can include any of the optional condition behaviors described above.

The system builds a variational system to be solved based on the user input, any applied basic condition behaviors, and any optional condition behaviors (1025). The basic condition behaviors and optional condition behaviors can be treated as preferences, and these and other preferences can be ordered and applied as a part of building the variational system, which can be maintained in a memory or other storage as variational system 154.

The system performs a variational solve on the variational system to produce an edited CAD model (1030).

The system stores or displays the edited CAD model (1035).

Of course, those of skill in the art will recognize that, unless specifically indicated or required by the sequence of operations, certain steps in the processes described above may be omitted, performed concurrently or sequentially, or performed in a different order.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for Computer Aided Design (CAD) editing performed by a data processing system, comprising:
receiving a CAD model including a plurality of entities;
receiving a user input including a selection of at least one entity and a movement of the selected entity;
applying any basic condition behaviors that correspond to the user input;
applying any optional condition behaviors that correspond to the user input;
building a variational system to be solved based on the user input, any applied basic condition behaviors, and any optional condition behaviors;
performing a variational solve on the variational system to produce an edited CAD model; and
storing the edited CAD model.

2. The method of claim 1, wherein the data processing system applies at least one basic condition behavior that is a single edge vertex condition, a two-edge vertex condition, a touching-vertex condition, a three-or-more-edge-vertex condition, a connected-arc condition, or a general-curve condition.

3. The method of claim 1, wherein the data processing system applies at least one basic condition behavior that is a two-edge vertex tangency condition, a general tangency condition, or a three-edge-vertex tangency condition.

4. The method of claim 1, wherein building the variational system includes ordering and applying preferences.

5. The method of claim 4, wherein the preferences include chord-height-locking and rigid-if-possible preferences.

6. The method of claim 1, wherein the data processing system also discovers geometric conditions of the CAD model.

7. The method of claim 6, wherein the geometric conditions include coincident vertices and vertex-on-edge conditions.

8. A data processing system comprising:
a processor; and
an accessible memory, the data processing system particularly configured to:
receive a Computer Aided Design (CAD) model including a plurality of entities;
receive a user input including a selection of at least one entity and a movement of the selected entity;
apply any basic condition behaviors that correspond to the user input;
apply any optional condition behaviors that correspond to the user input;
build a variational system to be solved based on the user input, any applied basic condition behaviors, and any optional condition behaviors;
perform a variational solve on the variational system to produce an edited CAD model; and
store the edited CAD model.

9. The data processing system of claim 8, wherein the data processing system applies at least one basic condition behavior that is a single edge vertex condition, a two-edge vertex condition, a touching-vertex condition, a three-or-more-edge-vertex condition, a connected-arc condition, or a general-curve condition.

10. The data processing system of claim 8, wherein the data processing system applies at least one basic condition behavior that is a two-edge vertex tangency condition, a general tangency condition, or a three-edge-vertex tangency condition.

11. The data processing system of claim 8, wherein building the variational system includes ordering and applying preferences.

12. The data processing system of claim 11, wherein the preferences include chord-height-locking and rigid-if-possible preferences.

13. The data processing system of claim 8, wherein the data processing system also discovers geometric conditions of the CAD model.

14. The data processing system of claim 13, wherein the geometric conditions include coincident vertices and vertex-on-edge conditions.

15. A non-transitory computer-readable medium encoded with executable instructions that, when executed, cause one or more data processing systems to:
receive a Computer Aided Design (CAD) model including a plurality of entities;
receive a user input including a selection of at least one entity and a movement of the selected entity;
apply any basic condition behaviors that correspond to the user input;
apply any optional condition behaviors that correspond to the user input;
build a variational system to be solved based on the user input, any applied basic condition behaviors, and any optional condition behaviors;
perform a variational solve on the variational system to produce an edited CAD model; and
store the edited CAD model.

16. The computer-readable medium of claim 15, wherein the data processing system applies at least one basic condition behavior that is a single edge vertex condition, a two-edge vertex condition, a touching-vertex condition, a three-or-more-edge-vertex condition, a connected-arc condition, or a general-curve condition.

17. The computer-readable medium of claim 15, wherein the data processing system applies at least one basic condition behavior that is a two-edge vertex tangency condition, a general tangency condition, or a three-edge-vertex tangency condition.

18. The computer-readable medium of claim 15, wherein building the variational system includes ordering and applying preferences.

19. The computer-readable medium of claim 18, wherein the preferences include chord-height-locking and rigid-if-possible preferences.

20. The computer-readable medium of claim 15, wherein the data processing system also discovers geometric conditions of the CAD model including coincident vertices and vertex-on-edge conditions.

* * * * *